(12) United States Patent
Yu et al.

(10) Patent No.: US 11,252,621 B2
(45) Date of Patent: Feb. 15, 2022

(54) UPLINK CARRIER HANDOVER METHOD, NETWORK DEVICE, AND TERMINAL DEVICE

(71) Applicant: HUAWEI TECHNOLOGIES CO., LTD., Guangdong (CN)

(72) Inventors: Feng Yu, Beijing (CN); Bo Lin, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 29 days.

(21) Appl. No.: 16/673,301

(22) Filed: Nov. 4, 2019

(65) Prior Publication Data

US 2020/0068465 A1 Feb. 27, 2020

Related U.S. Application Data

(63) Continuation of application No. PCT/CN2018/084152, filed on Apr. 24, 2018.

(30) Foreign Application Priority Data

May 4, 2017 (CN) .......................... 201710317264.3

(51) Int. Cl.
*H04W 36/06* (2009.01)
*H04W 36/00* (2009.01)
(Continued)

(52) U.S. Cl.
CPC ....... *H04W 36/06* (2013.01); *H04W 36/0058* (2018.08); *H04W 36/30* (2013.01); *H04W 72/042* (2013.01); *H04W 76/27* (2018.02)

(58) Field of Classification Search
CPC ............. H04W 36/06; H04W 36/0022; H04W 36/0058; H04W 36/30; H04W 76/27; H04W 72/02; H04W 72/04; H04W 72/042

See application file for complete search history.

(56) References Cited

U.S. PATENT DOCUMENTS

| 8,477,737 | B2 * | 7/2013 | Rao ........................ | H04W 36/04 370/333 |
| 9,351,204 | B2 * | 5/2016 | Takano ................ | H04W 72/12 |

(Continued)

FOREIGN PATENT DOCUMENTS

| CN | 101772050 A | 7/2010 |
| CN | 101904199 A | 12/2010 |

(Continued)

OTHER PUBLICATIONS

Extended European Search Report issued in European Application No. 18795126.4 dated Mar. 26, 2020, 17 pages.

(Continued)

*Primary Examiner* — Candal Elpenord
(74) *Attorney, Agent, or Firm* — Fish & Richardson P.C.

(57) ABSTRACT

This application provides example uplink carrier handover methods, network devices, and terminal devices. One example method includes obtaining, by a network device, target measurement information, where the network device communicates with a terminal device in a current cell by using a first uplink carrier and a second uplink carrier. The network device can then determine, based on the target measurement information, whether the terminal device needs to be handed over from the first uplink carrier to the second uplink carrier. In response to determining that the terminal device needs to be handed over from the first uplink carrier to the second uplink carrier, the network device can send handover instruction information to the terminal device.

16 Claims, 6 Drawing Sheets

(51) Int. Cl.
*H04W 36/30* (2009.01)
*H04W 76/27* (2018.01)
*H04W 72/04* (2009.01)

(56) References Cited

U.S. PATENT DOCUMENTS

| | | | |
|---|---|---|---|
| 9,402,208 B2* | 7/2016 | Zhang | H04W 36/0005 |
| 10,743,232 B1* | 8/2020 | Mehta | H04L 5/0041 |
| 2009/0163208 A1 | 6/2009 | Rao | |
| 2009/0245207 A1 | 10/2009 | Rao | |
| 2010/0323744 A1 | 12/2010 | Kim et al. | |
| 2011/0244860 A1* | 10/2011 | Wu | H04W 74/0833 |
| | | | 455/436 |
| 2012/0026976 A1* | 2/2012 | Chang | H04W 36/0005 |
| | | | 370/331 |
| 2012/0026980 A1* | 2/2012 | Gao | H04W 36/0077 |
| | | | 370/331 |
| 2012/0163185 A1* | 6/2012 | Zhang | H04W 36/0069 |
| | | | 370/241 |
| 2013/0163454 A1* | 6/2013 | Liang | H04W 24/10 |
| | | | 370/252 |
| 2013/0310037 A1* | 11/2013 | Ji | H04W 36/0085 |
| | | | 455/436 |
| 2014/0071946 A1 | 3/2014 | Terry et al. | |
| 2015/0208263 A1* | 7/2015 | Behravan | H04L 5/0057 |
| | | | 370/252 |
| 2016/0105818 A1* | 4/2016 | Lu | H04L 47/12 |
| | | | 370/229 |
| 2016/0227451 A1 | 8/2016 | Chung et al. | |
| 2016/0338137 A1* | 11/2016 | Mishra | H04W 36/16 |
| 2018/0076872 A1* | 3/2018 | Li | H04W 8/24 |

FOREIGN PATENT DOCUMENTS

| | | |
|---|---|---|
| CN | 101981964 A | 2/2011 |
| CN | 102572879 A | 7/2012 |
| CN | 102804872 A | 11/2012 |
| CN | 105099597 A | 11/2015 |
| EP | 3188542 A1 | 7/2017 |
| WO | 9619873 A1 | 6/1996 |
| WO | 03049480 A1 | 6/2003 |
| WO | 2011059373 A1 | 5/2011 |
| WO | 2016029864 A1 | 3/2016 |

OTHER PUBLICATIONS

Huawei, "Considerations of NR UL operation for LTE-NR coexistence",3GPP TSG RAN WG1 Meeting #88bis, Spokane, R1-1704199, USA, Apr. 3-7, 2017, 7 pages.

PCT International Search Report and Written Opinion in International Application No. PCT/CN2018/084,152, dated Jul. 18, 2018, 16 pages (With English Translation).

Office Action issued in Chinese Application No. 201710317264.3 dated Dec. 16, 2019, 15 pages (with English Translation).

* cited by examiner

UPLINK CARRIER HANDOVER METHOD, NETWORK DEVICE, AND TERMINAL DEVICE

CROSS-REFERENCE TO RELATED APPLICATIONS

This application is a continuation of International Application No. PCT/CN2018/084152, filed on Apr. 24, 2018, which claims priority to Chinese Patent Application No. 201710317264.3, filed on May 4, 2017. The disclosures of the aforementioned applications are hereby incorporated by reference in their entireties.

TECHNICAL FIELD

This application relates to the communications field, and more specifically, to an uplink carrier handover method, a network device, and a terminal device.

BACKGROUND

Currently, a 5G new radio (NR) project in the 5th generation mobile communications technology (5G) may be deployed on a 3.5G frequency band, and has performance such as a high speed, high efficiency, high reliability, and low latency during data transmission.

In 5G NR, during downlink data transmission, quite good downlink coverage may be implemented because power of a network device (for example, a base station) is relatively high. However, during uplink data transmission, uplink coverage may be limited because transmit power of a terminal device is limited. To resolve a problem of the limited uplink coverage in the 5G NR, the standard specifies that an uplink carrier of a 1.8G frequency band in a long term evolution technology (LTE) may be used for uplink data transmission in the 5G NR. Because a high frequency signal attenuates relatively fast, for same power, a higher frequency channel number may correspond to smaller coverage. A frequency channel number of the 1.8G frequency band is relatively low, and therefore, coverage of 1.8 G frequency band is better than that of the 3.5G frequency band. In addition, because a load of an uplink service is lighter than that of a downlink service in the LTE, and there are more resources allocated to the 5G NR in uplink, uplink data can be normally transmitted in the 5G NR. Because the uplink carrier of the frequency band in the LTE is used for the 5G NR, an application scenario is formed, in which there may be a plurality of uplink carriers (for example, a 1.8G uplink carrier and a 3.5G uplink carrier) and one downlink carrier in a cell. In this application scenario, because there are the plurality of uplink carriers, during data transmission, it is necessary to determine an uplink carrier on which data is to be transmitted.

SUMMARY

This application provides an uplink carrier handover method, a network device, and a terminal device, so that a network device instructs a terminal device to perform uplink carrier handover. Therefore, an uplink carrier on which the terminal device needs to work can be determined more accurately and reliably, ensuring normal communication between the terminal device and the network device.

According to a first aspect, an uplink carrier handover method is provided, and the method includes: obtaining, by a network device, target measurement information, where the network device communicates with a terminal device in a current cell by using a first uplink carrier and a second uplink carrier, and the target measurement information includes at least one of the following measurement information: first uplink measurement information corresponding to the first uplink carrier, second uplink measurement information corresponding to the second uplink carrier, and downlink measurement information; determining, by the network device based on the target measurement information, whether the terminal device needs to be handed over from the first uplink carrier to the second uplink carrier; and when the terminal device needs to be handed over from the first uplink carrier to the second uplink carrier, sending, by the network device, handover instruction information to the terminal device, where the handover instruction information is used to instruct the terminal device to be handed over from the first uplink carrier to the second uplink carrier.

In this embodiment of this application, the network device determines, based on the target measurement information, whether the terminal device needs to perform the uplink carrier handover. When determining that the terminal device needs to perform the uplink carrier handover, the network device sends the handover instruction information to the terminal device, to instruct the terminal device to perform the uplink carrier handover. Therefore, an uplink carrier on which the terminal device needs to work can be determined more accurately and reliably, ensuring normal communication between the terminal device and the network device.

With reference to the first aspect, in a first implementation of the first aspect, the determining, based on the target measurement information, whether the terminal device needs to be handed over from the first uplink carrier to the second uplink carrier includes: comparing, by the network device, the target measurement information with a preset threshold corresponding to the target measurement information; and determining, by the network device, based on a comparison result of the comparison, whether the terminal device needs to be handed over from the first uplink carrier to the second uplink carrier.

With reference to the first aspect or the first implementation of the first aspect, in a second implementation of the first aspect, the method further includes: determining, by the network device based on respective load statuses of the first uplink carrier and the second uplink carrier, whether the terminal device needs to be handed over from the first uplink carrier to the second uplink carrier.

In this embodiment of this application, the network device may further determine, based on both the target measurement information and the load status of the uplink carrier in the cell in which the terminal device is located, whether the terminal device needs to perform the uplink carrier handover. Therefore, an uplink carrier on which the terminal device needs to work can be determined more accurately and reliably.

With reference to the first aspect, the first implementation or the second implementation of the first aspect, in a third implementation of the first aspect, the obtaining, by a network device, target measurement information includes: receiving, by the network device, a first uplink measurement signal sent by the terminal device on the first uplink carrier and a second uplink measurement signal sent on the second uplink carrier; determining, by the network device, the first uplink measurement information based on the first uplink measurement signal; and determining, by the network device, the second uplink measurement information based on the second uplink measurement signal.

With reference to any one of the first aspect, or the first to the third implementations of the first aspect, in a fourth implementation of the first aspect, before the receiving, by the network device, a first uplink measurement signal sent by the terminal device on the first uplink carrier and a second uplink measurement signal sent on the second uplink carrier, the method further includes: sending, by the network device, first configuration information to the terminal device, where the first configuration information includes resource locations for sending the first uplink measurement signal and the second uplink measurement signal.

With reference to any one of the first aspect, or the first to the fourth implementations of the first aspect, in a fifth implementation of the first aspect, the obtaining, by a network device, target measurement information includes: receiving, by the network device, the downlink measurement information sent by the terminal device.

With reference to any one of the first aspect, or the first to the fifth implementations of the first aspect, in a sixth implementation of the first aspect, before the receiving, by the network device, the downlink measurement information sent by the terminal device, the method further includes: sending, by the network device, second configuration information to the terminal device, where the second configuration information is used to configure a type of a downlink measurement event for the terminal device, and the downlink measurement event is used by the terminal device to obtain the downlink measurement information by measuring the downlink measurement signal sent by the network device.

With reference to any one of the first aspect, or the first to the sixth implementations of the first aspect, in a seventh implementation of the first aspect, the first configuration information and the second configuration information are a system message or dedicated radio resource control RRC signaling.

With reference to any one of the first aspect, or the first to the seventh implementations of the first aspect, in an eighth implementation of the first aspect, the handover instruction information is at least one of RRC signaling, a media access control control element, and downlink control information carried on a physical downlink control channel.

According to a second aspect, an uplink carrier handover method is provided, and the method includes: sending, by a terminal device, at least one of downlink measurement information, a first uplink measurement signal, and a second uplink measurement signal to a network device, where at least one of the downlink measurement information, the first uplink measurement signal, and the second uplink measurement signal is used by the network device to determine target measurement information, the target measurement information includes at least one of the following measurement information: first uplink measurement information corresponding to a first uplink carrier, second uplink measurement information corresponding to a second uplink carrier, and the downlink measurement information, the target measurement information is used by the network device to determine whether the terminal device needs to be handed over from the first uplink carrier to the second uplink carrier, and the network device communicates with the terminal device in a current cell by using the first uplink carrier and the second uplink carrier; and when the network device determines that the terminal device needs to be handed over from the first uplink carrier to the second uplink carrier, receiving, by the terminal device, handover instruction information sent by the network device, where the handover instruction information is used to instruct the terminal device to be handed over from the first uplink carrier to the second uplink carrier.

In this embodiment of this application, the network device determines, based on the target measurement information, whether the terminal device needs to perform the uplink carrier handover. When determining that the terminal device needs to perform the uplink carrier handover, the network device sends the handover instruction information to the terminal device, to instruct the terminal device to perform the uplink carrier handover. Therefore, an uplink carrier on which the terminal device needs to work can be determined more accurately and reliably, ensuring normal communication between the terminal device and the network device.

With reference to the second aspect, in a first implementation of the second aspect, before the sending, by a terminal device, at least one of downlink measurement information, a first uplink measurement signal, and a second uplink measurement signal to a network device, the method further includes: receiving, by the terminal device, first configuration information sent by the network device, where the first configuration information includes resource locations for sending the first uplink measurement signal and the second uplink measurement signal; and/or receiving, by the terminal device, second configuration information sent by the network device, where the second configuration information is used by the network device to configure a type of a downlink measurement event for the terminal device, and the downlink measurement event is used by the terminal device to obtain the downlink measurement information by measuring the downlink measurement signal sent by the network device.

With reference to the second aspect or the first implementation of the second aspect, in a second implementation of the second aspect, the first configuration information and the second configuration information are a system message or dedicated radio resource control RRC signaling.

With reference to the second aspect, or the first implementation or the second implementation of the second aspect, in a third implementation of the second aspect, the handover instruction information is at least one of RRC signaling, a media access control control element, and downlink control information carried on a physical downlink control channel.

According to a third aspect, a network device is provided, including one or more modules configured to perform the method embodiments in the first aspect.

According to a fourth aspect, a terminal device is provided, including one or more modules configured to perform the method embodiments in the second aspect.

According to a fifth aspect, a network device is provided, including a memory and a processor, the memory is configured to store program code, and the processor is configured to invoke the program code to implement the method in the first aspect and the implementations of the first aspect.

According to a sixth aspect, a terminal device is provided, including a memory and a processor, the memory is configured to store program code, and the processor is configured to invoke the program code to implement the method in the second aspect and the implementations of the second aspect.

According to a seventh aspect, a computer readable medium is provided, the computer readable medium is configured to store program code that may be executed by a first wearable terminal device, and the program code includes an instruction used to execute the method according to any one of the first aspect and the implementations of the first aspect.

According to an eighth aspect, a computer readable medium is provided, the computer readable medium is configured to store program code that may be executed by a second terminal device, and the program code includes an instruction used to execute the method according to any one of the second aspect and the implementations of the second aspect.

According to a ninth aspect, an uplink carrier handover apparatus is provided, and the apparatus may be a network device, or may be a chip in a network device. The apparatus may include a processing unit and a transceiver unit. When the apparatus is the network device, the processing unit may be a processor, and the transceiver unit may be a transceiver. The network device may further include a storage unit, and the storage unit may be a memory. The storage unit is configured to store an instruction. The processing unit executes the instruction stored in the storage unit, so that the network device performs the method according to any one of the first aspect and the implementations of the first aspect. When the apparatus is the chip in the network device, the processing unit may be a processor, and the transceiver unit may be an input/output interface, a pin, a circuit, or the like. The processing unit executes an instruction stored in a storage unit, so that the network device performs the method according to any one of the first aspect and the implementations of the first aspect. The storage unit may be a storage unit (such as a register or a cache) in the chip, or may be a storage unit (such as a read-only memory or a random access memory) inside the network device and outside the chip.

According to a tenth aspect, an embodiment of this application provides an uplink carrier handover apparatus, and the apparatus may be a terminal device, or may be a chip in a terminal device. The apparatus may include a processing unit and a transceiver unit. When the apparatus is the terminal device, the processing unit may be a processor, and the transceiver unit may be a transceiver. The terminal device may further include a storage unit, and the storage unit may be a memory. The storage unit is configured to store an instruction. The processing unit executes the instruction stored in the storage unit, so that the terminal device performs the method according to any one of the second aspect and the implementations of the second aspect. When the apparatus is the chip in the terminal device, the processing unit may be a processor, and the transceiver unit may be an input/output interface, a pin, a circuit, or the like. The processing unit executes an instruction stored in a storage unit, so that the terminal device performs the method according to any one of the second aspect and the implementations of the second aspect. The storage unit may be a storage unit (such as a register or a cache) in the chip, or may be a storage unit (such as a read-only memory or a random access memory) inside the terminal device and outside the chip.

DESCRIPTION OF EMBODIMENTS

The following describes technical solutions of this application with reference to accompanying drawings.

In the prior art, similar to a scenario in which there are a plurality of uplink carriers and one downlink carrier in a cell in 5G NR, a scenario also exists in a cellular-based narrowband Internet of things (NB-IoT) scenario. In the NB-IoT scenario, when an uplink carrier on which a terminal device needs to work is determined, a concept of a coverage level is introduced. Each uplink carrier is corresponding to one coverage level. For example, when the terminal device is in an idle mode, if the terminal device needs to access a cell, the terminal device may measure downlink reference signal received power (RSRP). Different RSRP is corresponding to different coverage levels. The cell broadcasts, by using a system message to the terminal device, an uplink carrier corresponding to each coverage level, a quantity of repetition times of a random access preamble sequence on each uplink carrier, and another access parameter. The terminal device may determine, based on a coverage level corresponding to the measured RSRP, an uplink carrier required for performing access. For another example, when the terminal device is in a connected mode, because the terminal device knows a coverage level of the terminal device in advance, when the terminal device needs to transmit uplink data, the terminal device may send the uplink data based on an uplink carrier corresponding to the coverage level of the terminal device. That is, in the NB-IoT scenario, when determining an uplink carrier on which the terminal device needs to send data or an uplink carrier by using which the terminal device accesses the cell, the terminal device needs to determine the uplink carrier based on downlink measurement or a coverage level.

However, in the 5G NR scenario, during determining of the uplink carrier on which the terminal device needs to work, a problem may exist even if the foregoing method is used. For example, in the foregoing method, the terminal device determines the uplink carrier based on the downlink measurement or the coverage level. Consequently, reliability of the determining is not high. In addition, the uplink carrier needs to be determined, while the uplink carrier is determined through the downlink measurement in the foregoing method. Consequently, the uplink carrier is selected inaccurately. Therefore, the embodiments of this application provide a carrier handover method, in which the network device instructs the terminal device to perform uplink carrier handover, so that the uplink carrier on which the terminal device needs to work can be determined more accurately and reliably.

Figures 1, 2:
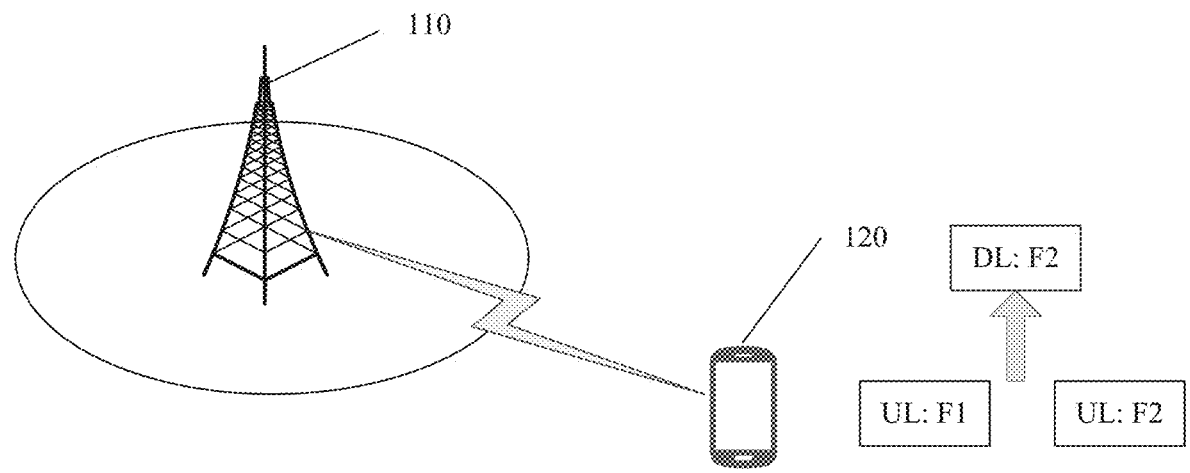
FIG. 1 is a schematic architectural diagram of an application scenario according to an embodiment of this application.
FIG. 2 is a schematic flowchart of an uplink carrier handover method according to an embodiment of this application.

FIG. 1 is a schematic architectural diagram of an application scenario according to an embodiment of this application. As shown in FIG. 1, a network 100 includes a network device 110 and a terminal device 120. The terminal device 120 may be a terminal device such as a smartphone or a notebook computer.

The scenario shown in FIG. 1 is a scenario in 5G NR. In this scenario, the terminal device 120 in a current cell transmits uplink data with the network device 110 or accesses the current cell by using a first uplink carrier and a second uplink carrier. A frequency band of the first uplink carrier is F1, and a frequency band of the second uplink carrier is F2. The network device 110 and the terminal device 120 transmit downlink data by using a downlink carrier. A frequency band of the downlink carrier is F2, and the downlink carrier and the second uplink carrier are a pair of systematically associated carriers. A design of a plurality of uplink carriers can avoid a problem of limited uplink coverage in a 5G NR scenario, so that the terminal device 120 and the network device 110 can normally communicate with each other.

Based on the application scenario shown in FIG. 1, the embodiments of this application provide an uplink carrier handover method, in which a network device instructs, by using information such as uplink measurement information, downlink measurement information reported by a terminal device, or a load status of an uplink carrier, the terminal device to perform uplink carrier handover. Therefore, an uplink carrier on which the terminal device needs to work can be determined more accurately and reliably.

FIG. 2 is a schematic flowchart of an uplink carrier handover method 200 according to an embodiment of this application. The method 200 is performed by a network device, for example, may be performed by the network device 110 in the network 100. As shown in FIG. 2, the method 200 includes the following steps:

210. The network device obtains target measurement information.

220. Determine, based on the target measurement information obtained by the network device, whether a terminal device needs to be handed over from a first uplink carrier to a second uplink carrier.

230. Send handover instruction information to the terminal device when the terminal device needs to be handed over from the first uplink carrier to the second uplink carrier.

In this embodiment of this application, the network device obtains the target measurement information, and can determine, based on the target measurement information, whether the terminal device needs to be handed over from the first uplink carrier to the second uplink carrier. When determining that the terminal device needs to be handed over from the first uplink carrier to the second uplink carrier, the network device may instruct, by using the handover instruction information, the terminal device to perform the uplink carrier handover. Because this action is performed by the network device, an uplink carrier on which the terminal device needs to work can be determined more accurately and reliably, thereby ensuring normal communication between the network device and the terminal device.

It should be understood that when a cell in which the terminal device is located supports a plurality of shared uplink carriers, the terminal device cannot send data on more than one uplink carrier at a same moment. Therefore, the terminal device needs to select, from the plurality of shared uplink carriers, a proper uplink carrier to send the data or access the current cell.

It should be further understood that when the terminal device supports a carrier aggregation technology or a multi-connectivity technology, the terminal device may simultaneously send the data on a plurality of uplink subcarriers included in the carrier aggregation, or the terminal device may simultaneously send the data on a plurality of uplink carriers of the multi-connectivity technology. This is not limited in this embodiment of this application.

It should be further understood that, in the method 200, the network device communicates with the terminal device in the current cell by using the first uplink carrier and the second uplink carrier. The first uplink carrier and the second uplink carrier are two uplink carriers in the current cell. However, in this embodiment of this application, only an example in which there are two uplink carriers in the current cell in which the terminal device is located is used. However, this embodiment of this application is not limited thereto. The method 200 may also be applicable to a case in which there are a plurality of uplink carriers in the cell in which the terminal device is located.

It should be further understood that, the first uplink carrier in step 220 is an uplink carrier on which the terminal device currently works, and the second uplink carrier is a target uplink carrier to which the terminal device needs to be handed over. Frequency band values of the first uplink carrier and the second uplink carrier are not limited in this embodiment of this application.

Optionally, in some embodiments, the target measurement information obtained by the network device may be first uplink measurement information corresponding to the first uplink carrier, second uplink measurement information corresponding to the second uplink carrier, or may be downlink measurement information corresponding to a downlink carrier.

It should be understood that the terminal device may obtain all of the first uplink measurement information, the second uplink measurement information, and the downlink measurement information, or may obtain one or two of the foregoing three pieces of target measurement information. This is not limited in this embodiment of this application.

Optionally, in some embodiments, when the network device obtains the first uplink measurement information, the network device may receive a first uplink measurement signal sent by the terminal device on the first uplink carrier, and the network device may perform uplink measurement on the first uplink measurement signal, so as to determine the first uplink measurement information.

Optionally, in some embodiments, the first uplink measurement signal may be an uplink reference signal sent by the terminal device on the first uplink carrier. For example, the uplink reference signal may be a sounding reference signal (SRS), and the first uplink measurement information may be uplink channel quality information determined by the network device based on the sounding reference signal SRS.

Optionally, in some embodiments, when the network device obtains the second uplink measurement information, the network device may receive a second uplink measurement signal sent by the terminal device on the second uplink carrier, and the network device may perform uplink measurement on the second uplink measurement signal, so as to determine the second uplink measurement information.

Optionally, in some embodiments, the second uplink measurement signal may be an uplink reference signal sent by the terminal device on the second uplink carrier. For example, the uplink reference signal may be a sounding reference signal SRS, and the second uplink measurement information may be uplink channel quality information that is determined by the network device based on the sounding reference signal SRS sent by the terminal device on the second uplink carrier.

It should be understood that, in this embodiment of this application, the uplink measurement information (the first uplink measurement information or the second uplink measurement information) may further be uplink measurement information other than uplink reference signal received power RSRP. In this embodiment of this application, only an example in which the uplink reference information is the uplink reference signal received power is used for description. However, this embodiment of this application is not limited thereto.

Likewise, in this embodiment of this application, the uplink measurement signal (the first uplink measurement signal or the second uplink measurement signal) may further be uplink measurement signal other than the uplink reference signal SRS. In this embodiment of this application, only an example in which the uplink reference signal is the uplink reference signal SRS is used for description. However, this embodiment of this application is not limited thereto.

Optionally, in some embodiments, before the terminal device sends the uplink measurement signals (the first uplink measurement signal or the second uplink measurement signal) to the network device on different uplink carriers, the network device may further send first configuration information to the terminal device. The first configuration information includes a time-frequency resource location at which the terminal device sends the first uplink measurement signal on the first uplink carrier or the terminal device sends the second uplink measurement signal on the second uplink carrier. The terminal device sends the first uplink measurement signal or the second uplink measurement signal on a corresponding resource based on the resource location that is configured by the network device to send the first measurement signal or the second measurement signal.

It should be understood that when the terminal device sends the uplink measurement signals to the network device on different uplink carriers, uplink synchronization needs to be first ensured. For example, before the terminal device sends the SRS to the network device, the terminal device needs to ensure that the uplink synchronization has been performed. If the terminal device has not performed the uplink synchronization, the terminal device needs to obtain in advance, through random access on an uplink carrier for sending an SRS, parameters such as power and a time alignment (TA) value used by the terminal device to transmit uplink data next time, so that the terminal device can establish the uplink synchronization. The random access process may be a contention-based manner, or may be a non-contention based manner.

Optionally, in some embodiments, the first configuration information may be a system message or dedicated radio resource control (RRC) signaling.

Optionally, in some embodiments, when the network device obtains the downlink measurement information, the network device may directly receive the downlink measurement information reported by the terminal device, to select an uplink carrier and perform uplink carrier handover based on the downlink measurement information.

Optionally, in some embodiments, before the network device obtains the downlink measurement information, the network device may send second configuration information to the terminal device. The second configuration information may be used to configure a type of a downlink measurement event for the terminal device, and the downlink measurement event is an event that the terminal device measures a received downlink measurement signal to obtain the downlink measurement information.

Optionally, in some embodiments, the type of downlink measurement event may be any type of measurement event specified in the standard, for example, any one of a downlink measurement event A1, a downlink measurement event A2, a downlink measurement event A3 . . . . , a downlink measurement event B1, or a downlink measurement event B2.

Optionally, in some embodiments, the second configuration information may be further used to configure information for the terminal device, for example, measurement time of the downlink measurement event and a threshold for triggering the terminal device to report the downlink measurement information to the network device.

Optionally, in some embodiments, the terminal device may periodically send the downlink measurement information to the network device based on period duration configured by the network device, or may send the downlink measurement information to the terminal device based on an event triggering type configured by the network device after the event is triggered.

For example, the type of the measurement event that the terminal device measures the downlink measurement signal may be the downlink measurement event A2. In the downlink measurement event A2, when a measured value of the downlink measurement information is less than a first threshold, the terminal device may report the downlink measurement information to the network device. In this case, the first threshold is a triggering event that triggers the terminal device to send the downlink measurement information to the network device.

Optionally, in some embodiments, the second configuration information may be a system message or dedicated radio resource control RRC signaling.

It should be understood that the second configuration information and the first configuration information may be same information or may be different information. This is not limited in this embodiment of this application.

Optionally, in some embodiments, when the terminal device determines, based on the target measurement information, whether the terminal device needs to be handed over from the first uplink carrier to the second uplink carrier, the network device may compare the target measurement information with a preset threshold corresponding to the target measurement information, and determine, based on a result of the comparison, whether the terminal device needs to be handed over from the first uplink carrier to the second uplink carrier.

Optionally, in some embodiments, when the target measurement information obtained by the network device is the downlink measurement information, the network device compares the obtained downlink measurement information with a preset threshold (for example, a first preset threshold) corresponding to the downlink measurement information and determines whether the terminal device needs to be handed over from the first uplink carrier to the second uplink carrier.

For example, a frequency band of the first uplink carrier on which the terminal device currently works is F1, a frequency band of the second uplink carrier is F2, a frequency channel number of F1 is greater than a frequency channel number of F2, and a frequency band of the downlink carrier is F1. After obtaining the downlink measurement information, the network device compares the downlink measurement information with the first preset threshold. When the downlink measurement information is less than the first preset threshold, it indicates that channel quality of the first uplink carrier is not good in this case. Therefore, the terminal device may be handed over from the first uplink carrier to the second uplink carrier. When the downlink measurement information is greater than the first preset threshold, it indicates that the channel quality of the first uplink carrier is quite good in this case, and the uplink carrier handover may not be required.

Optionally, in some embodiments, when the target measurement information obtained by the network device is the first uplink measurement information, the network device needs to compare the first uplink measurement information with a preset threshold (for example, a second preset threshold) corresponding to the first uplink measurement information and determines whether the terminal device needs to be handed over from the first uplink carrier to the second uplink carrier.

Optionally, in some embodiments, when the target measurement information obtained by the network device is the second uplink measurement information, the network device needs to compare the second uplink measurement information with a preset threshold (for example, a third preset threshold) corresponding to the second uplink measurement information and determines whether the terminal device needs to be handed over from the first uplink carrier to the second uplink carrier.

Optionally, in some embodiments, when the target measurement information obtained by the network device is any two of the downlink measurement information, the first uplink measurement information, and the second uplink measurement information, the network device may compare the two types of obtained target measurement information with preset thresholds corresponding to the two types and determine whether the terminal device needs to be handed over from the first uplink carrier to the second uplink carrier.

Optionally, in some embodiments, the network device may alternatively compare the downlink measurement information with the first preset threshold, compare the first uplink measurement information with the second preset threshold, and comprehensively determine whether the terminal device needs to be handed over from the first uplink carrier to the second uplink carrier.

Optionally, in some embodiments, the network device may alternatively compare the downlink measurement information with the first preset threshold, compare the second uplink measurement information with the third preset threshold, and comprehensively determine whether the terminal device needs to be handed over from the first uplink carrier to the second uplink carrier.

Optionally, in some embodiments, the network device may alternatively compare the first uplink measurement information with the second preset threshold, compare the second uplink measurement information with the third preset threshold, and comprehensively determine whether the terminal device needs to be handed over from the first uplink carrier to the second uplink carrier.

Optionally, in some embodiments, when the network device obtains all the downlink measurement information, the first uplink measurement information, and the second uplink measurement information, the network device may compare the three types of target measurement information with respective preset thresholds corresponding to the three types, and jointly determine whether the terminal device needs to be handed over from the first uplink carrier to the second uplink carrier.

Optionally, in some embodiments, the network device may alternatively compare the downlink measurement information with the first preset threshold, compare the first uplink measurement information with the second preset threshold, compare the second uplink measurement information with the third preset threshold, and jointly determine whether the terminal device needs to be handed over from the first uplink carrier to the second uplink carrier.

Optionally, in some embodiments, the network device may further determine, based on the target measurement information and/or respective load statuses of the uplink carriers, whether the terminal device needs to be handed over from the first uplink carrier to the second uplink carrier.

Optionally, in some embodiments, the network device may alternatively compare the downlink measurement information with the first preset threshold, compare the first uplink measurement information with the second preset threshold, compare the second uplink measurement information with the third preset threshold, and jointly determine, with reference to the load statuses of the first uplink carrier and the second uplink carrier, whether the terminal device needs to be handed over from the first uplink carrier to the second uplink carrier.

For example, the network device finds that a load of the first uplink carrier is relatively heavy, and a load of the second uplink carrier is relatively light. In this case, the network device may determine to hand over the terminal device from the first uplink carrier to the second uplink carrier.

Optionally, in some embodiments, the terminal device may alternatively not report the downlink measurement information to the network device. After the terminal device performs the downlink measurement and measures the downlink measurement information about the downlink measurement signal, the terminal device may independently determine, based on the downlink measurement information, whether the terminal device needs to be handed over from the first uplink carrier to the second uplink carrier.

Optionally, in some embodiments, the handover instruction information is used to instruct the terminal device to be handed over from the first uplink carrier to the second uplink carrier.

Optionally, in some embodiments, the handover instruction information may be RRC signaling, a media access control control element (MAC CE), or downlink control information sent on a downlink physical control channel (PDCCH).

Optionally, in some embodiments, after the terminal device receives the handover instruction information sent by the network device, the terminal device is handed over, based on the handover instruction information, from the uplink carrier on which the terminal device currently works to an uplink carrier indicated in the handover instruction information. For example, if the uplink carrier on which the terminal device currently works is the first uplink carrier, the handover instruction information instructs the terminal device to be handed over from the first uplink carrier to the second uplink carrier, and the terminal device is handed over, based on the handover instruction information, from the uplink carrier on which the terminal device works to the second uplink carrier. After the terminal device performs the uplink carrier handover, the terminal device may send an uplink message on the uplink carrier to which the terminal device is handed over, and the uplink message may be a physical signal, a media access control protocol data unit (MAC PDU), or the like.

In this embodiment of this application, the network device determines, by using the target measurement information, whether the terminal device needs to perform the uplink carrier handover. Because this action is performed by the network device, an uplink carrier on which the terminal device needs to work can be determined more accurately and reliably, ensuring normal communication between the terminal device and the network device.

Figure 3:
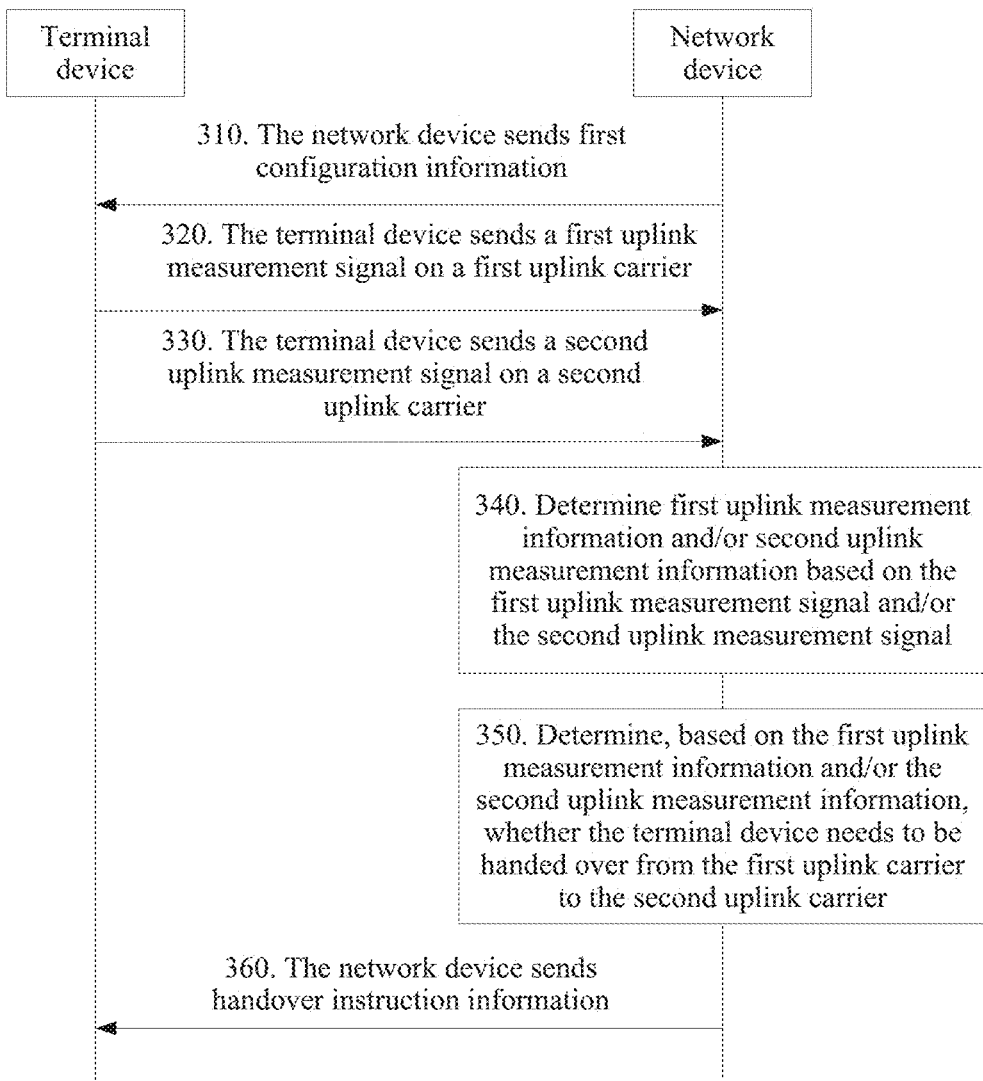
FIG. 3 is another schematic flowchart of an uplink carrier handover method according to an embodiment of this application.

FIG. 3 is a schematic flowchart of an uplink carrier handover method 300 according to an embodiment of this application. As shown in FIG. 3, the method 300 includes the following steps.

310. A network device sends first configuration information to a terminal device.

Optionally, in some embodiments, the first configuration information includes a time-frequency resource locations at which the terminal device sends a first uplink measurement signal on a first uplink carrier and/or the terminal device sends a second uplink measurement signal on a second uplink carrier. The terminal device sends the first uplink measurement signal or the second uplink measurement signal on a corresponding resource based on the resource location that is configured by the network device to send the first measurement signal or the second measurement signal.

Optionally, in some embodiments, the first configuration information may be a system message or dedicated radio resource control (RRC) signaling.

320. The terminal device sends the first uplink measurement signal to the network device on the first uplink carrier based on the resource location that is configured by the network device.

Optionally, in some embodiments, the first uplink measurement signal may be an uplink reference signal sent by the terminal device on the first uplink carrier. For example, the uplink reference signal may be a sounding reference signal (SRS), and first uplink measurement information may be uplink channel quality information determined by the network device based on the sounding reference signal SRS.

330. The terminal device sends the second uplink measurement signal to the terminal device on the second uplink carrier based on the resource location that is configured by the network device.

It should be understood that there is no time sequence between step 320 and step 330. The terminal device may first send the first uplink measurement signal and then send the second uplink measurement signal, or may simultaneously send the first uplink measurement signal and the second uplink measurement signal, or the terminal device sends only the first uplink measurement signal or sends only the second uplink measurement signal at a current moment. This is not limited in this embodiment of this application.

Optionally, in some embodiments, the second uplink measurement signal may be an uplink reference signal sent by the terminal device on the second uplink carrier. For example, the uplink reference signal may be a sounding reference signal SRS, and second uplink measurement information may be uplink channel quality information that is determined by the network device based on the sounding reference signal SRS sent by the terminal device on the second uplink carrier.

340. The network device performs uplink measurement on the received first uplink measurement signal and/or the received second uplink measurement signal to determine the first uplink measurement information and/or the second uplink measurement information.

350. The network device compares the first uplink measurement information and/or the second measurement information with respective preset thresholds corresponding to the first uplink measurement information and/or the second uplink measurement information, and determines whether the terminal device needs to be handed over from the first uplink carrier to the second uplink carrier.

Optionally, in some embodiments, the network device may compare the first uplink measurement information with a preset threshold (for example, a second preset threshold) corresponding to the first uplink measurement information, and determine whether the terminal device needs to be handed over from the first uplink carrier to the second uplink carrier.

Optionally, in some embodiments, the network device may compare the second uplink measurement information with a preset threshold (for example, a third preset threshold) corresponding to the second uplink measurement information, and determine whether the terminal device needs to be handed over from the first uplink carrier to the second uplink carrier.

Optionally, in some embodiments, the network device may alternatively compare the first uplink measurement information with the second preset threshold, compare the second uplink measurement information with the third preset threshold, and comprehensively determine, based on results of the comparison, whether the terminal device needs to be handed over from the first uplink carrier to the second uplink carrier.

Optionally, in some embodiments, the network device may alternatively compare the first uplink measurement information with the second preset threshold, compare the second uplink measurement information with the third preset threshold, and determine, with reference to load statuses of the uplink carriers, whether the terminal device needs to be handed over from the first uplink carrier to the second uplink carrier.

360. The network device sends handover instruction information to the terminal device when the terminal device needs to be handed over from the first uplink carrier to the second uplink carrier.

Optionally, in some embodiments, the handover instruction information is used to instruct the terminal device to be handed over from the first uplink carrier to the second uplink carrier.

Optionally, in some embodiments, the handover instruction information may be RRC signaling, a media access control control element (MAC CE), or downlink control information sent on a downlink physical control channel (PDCCH).

In this embodiment of this application, the network device determines, by using the target measurement information, whether the terminal device needs to perform the uplink carrier handover. Because this action is performed by the network device, an uplink carrier on which the terminal device needs to work can be determined more accurately and reliably, ensuring normal communication between the terminal device and the network device.

Figure 4:
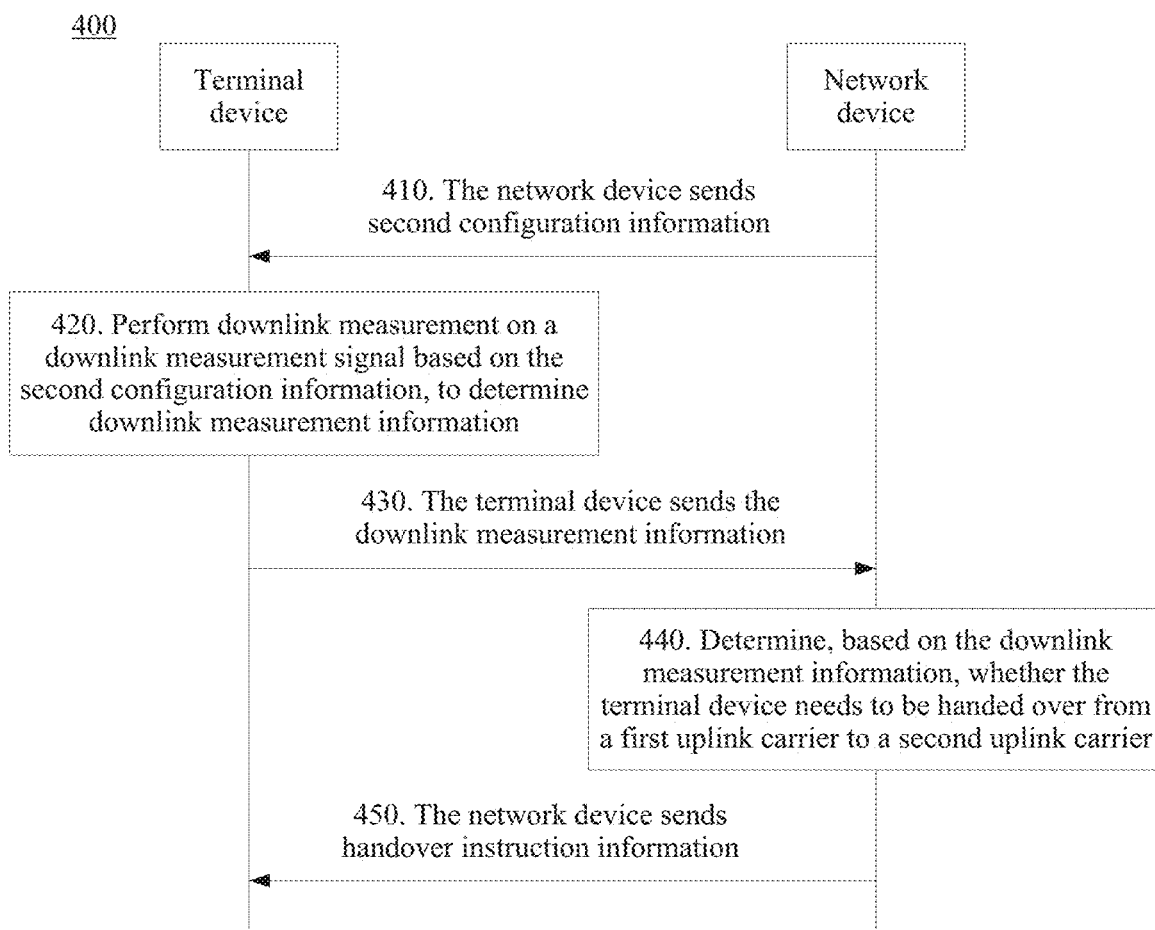
FIG. 4 is still another schematic flowchart of an uplink carrier handover method according to an embodiment of this application.

FIG. 4 is a schematic flowchart of an uplink carrier handover method 400 according to an embodiment of this application. As shown in FIG. 4, the method 400 includes the following steps.

410. A network device sends second configuration information to a terminal device.

Optionally, in some embodiments, the second configuration information may be used to configure a type of a downlink measurement event for the terminal device, and the downlink measurement event is an event that the terminal device measures a received downlink measurement signal to obtain downlink measurement information.

Optionally, in some embodiments, the type of downlink measurement event may be any type of measurement event specified in the standard, for example, a downlink measurement event A2.

Optionally, in some embodiments, the second configuration information may be further used to configure information for the terminal device, for example, measurement time of the downlink measurement event and a threshold for triggering the terminal device to report the downlink measurement information to the network device.

Optionally, in some embodiments, the terminal device may periodically send the downlink measurement information to the network device based on period duration configured by the network device, or may send the downlink measurement information to the terminal device based on an event triggering type configured by the network device after the event is triggered.

For example, the type of the measurement event that the terminal device measures the downlink measurement signal may be the downlink measurement event A2. In the downlink measurement event A2, when a measured value of the downlink measurement information is less than a first threshold, the terminal device may report the downlink measurement information to the network device. In this case, the first threshold is a triggering event that triggers the terminal device to send the downlink measurement information to the network device.

Optionally, in some embodiments, the second configuration information may be a system message or dedicated radio resource control (RRC) signaling.

420. The terminal device performs downlink measurement on the downlink measurement signal based on the second configuration information sent by the network device to determine the downlink measurement information.

Optionally, in some embodiments, the downlink measurement signal may be a downlink reference signal, and the downlink measurement information may be downlink reference signal received power RSRP.

430. The terminal device sends the downlink measurement information to the network device.

440. The network device determines based on the downlink measurement information sent by the terminal device whether the terminal device needs to be handed over from a first uplink carrier to a second uplink carrier.

Optionally, in some embodiments, the network device may compare the downlink measurement information with a preset threshold (a first preset threshold) corresponding to the downlink measurement information, and determine, based on a comparison result, whether the terminal device needs to be handed over from the first uplink carrier to the second uplink carrier.

450. The network device sends handover instruction information to the terminal device when determining that the terminal device needs to perform the uplink carrier handover.

Optionally, in some embodiments, the handover instruction information is used to instruct the terminal device to be handed over from the first uplink carrier to the second uplink carrier.

Optionally, in some embodiments, the handover instruction information may be RRC signaling, a media access control control element (MAC CE), or downlink control information sent on a downlink physical control channel (PDCCH).

In this embodiment of this application, the network device determines, by using the target measurement information, whether the terminal device needs to perform the uplink carrier handover. Because this action is performed by the network device, an uplink carrier on which the terminal device needs to work can be determined more accurately and reliably, ensuring normal communication between the terminal device and the network device.

Figure 5:
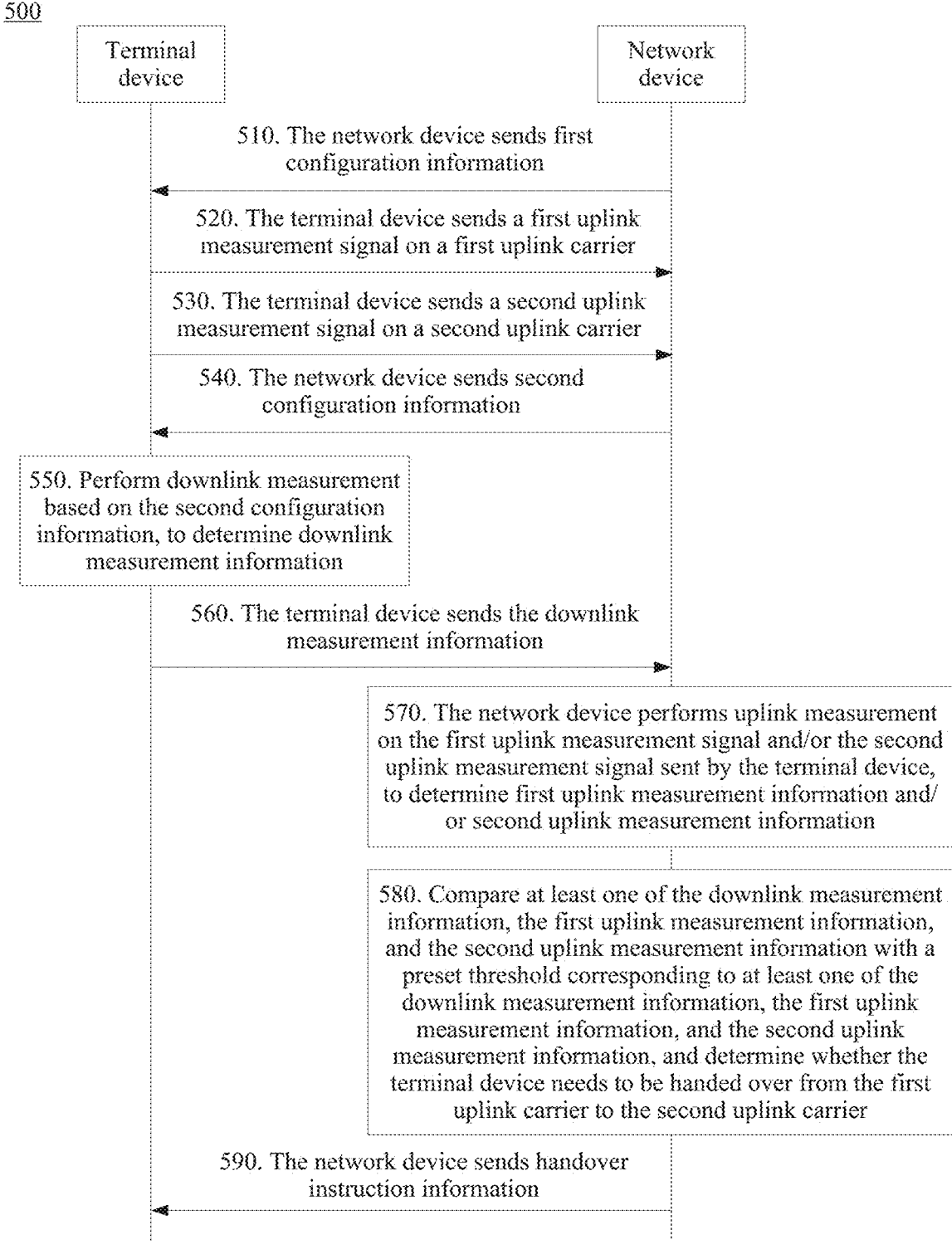
FIG. 5 is still another schematic flowchart of an uplink carrier handover method according to an embodiment of this application.

FIG. 5 is a schematic flowchart of an uplink carrier handover method 500 according to an embodiment of this application. As shown in FIG. 5, the method 500 includes the following steps.

510. A network device sends first configuration information to a terminal device.

Optionally, in some embodiments, the first configuration information includes a time-frequency resource location at which the terminal device sends a first uplink measurement signal on a first uplink carrier or the terminal device sends a second uplink measurement signal on a second uplink carrier. The terminal device sends the first uplink measurement signal or the second uplink measurement signal on a corresponding resource based on the resource location that is configured by the network device to send the first measurement signal or the second measurement signal.

Optionally, in some embodiments, the first configuration information may be a system message or dedicated radio resource control (RRC) signaling.

520. The terminal device sends the first uplink measurement signal to the network device on the first uplink carrier.

530. The terminal device sends the second uplink measurement signal to the network device on the second uplink carrier.

It should be understood that there is no time sequence between step 520 and step 530. The terminal device may first send the first uplink measurement signal and then send the second uplink measurement signal, or may simultaneously send the first uplink measurement signal and the second uplink measurement signal, or the terminal device sends only the first uplink measurement signal or sends only the second uplink measurement signal at a current moment. This is not limited in this embodiment of this application.

540. The network device sends second configuration information to the terminal device.

Optionally, in some embodiments, the second configuration information may be used to configure a type of a downlink measurement event for the terminal device, and the downlink measurement event is an event that the terminal device measures a received downlink measurement signal to obtain downlink measurement information.

Optionally, in some embodiments, the type of downlink measurement event may be any type of measurement event specified in the standard, for example, a downlink measurement event A2.

Optionally, in some embodiments, the second configuration information may be further used to configure information for the terminal device, for example, measurement time of the downlink measurement event and a threshold for triggering the terminal device to report the downlink measurement information to the network device.

Optionally, in some embodiments, the terminal device may periodically send the downlink measurement information to the network device based on period duration configured by the network device, or may send the downlink measurement information to the terminal device based on an event triggering type configured by the network device after the event is triggered.

For example, the type of the measurement event that the terminal device measures the downlink measurement signal may be the downlink measurement event A2. In the downlink measurement event A2, when a measured value of the downlink measurement information is less than a first threshold, the terminal device may report the downlink measurement information to the network device. In this case, the first threshold is a triggering event that triggers the terminal device to send the downlink measurement information to the network device.

Optionally, in some embodiments, the second configuration information may be a system message or dedicated radio resource control (RRC) signaling.

Optionally, in some embodiments, the first configuration information and the second configuration information may be same or may be different. This embodiment of this application is not limited thereto.

550. The terminal device measures the downlink measurement signal based on the second configuration information, to determine the downlink measurement information.

It should be further understood that there is no time sequence between step 550 and steps 520 and 530. The terminal device may send the uplink measurement signal, receive the downlink measurement signal, and measure the downlink measurement signal at a same moment, to obtain the downlink measurement information.

560. The terminal device sends the downlink measurement information to the network device.

570. The network device performs uplink measurement on the first uplink measurement signal and/or the second uplink measurement signal sent by the terminal device, to determine first uplink measurement information and/or second uplink measurement information.

580. The network device compares at least one of the downlink measurement information, the first uplink measurement information, and the second uplink measurement information with a preset threshold corresponding to at least one of the downlink measurement information, the first uplink measurement information, and the second uplink measurement information, and determines whether the terminal device needs to be handed over from the first uplink carrier to the second uplink carrier.

Optionally, in some embodiments, the network device may compare only the downlink measurement information with a preset threshold (a first preset threshold) corresponding to the downlink measurement information, and determine whether the terminal device needs to be handed over from the first uplink carrier to the second uplink carrier.

Optionally, in some embodiments, the network device may alternatively compare only the first uplink measurement information with a preset threshold (a second preset threshold) corresponding to the first uplink measurement information, and determine whether the terminal device needs to be handed over from the first uplink carrier to the second uplink carrier.

Optionally, in some embodiments, the network device may alternatively compare only the second uplink measurement information with a preset threshold (a third preset threshold) corresponding to the second uplink measurement information, and determine whether the terminal device needs to be handed over from the first uplink carrier to the second uplink carrier.

Optionally, in some embodiments, the network device may alternatively compare the downlink measurement information with the first preset threshold, compare the first uplink measurement information with the second preset threshold, and comprehensively determine whether the terminal device needs to be handed over from the first uplink carrier to the second uplink carrier.

Optionally, in some embodiments, the network device may alternatively compare the downlink measurement information with the first preset threshold, compare the second uplink measurement information with the third preset threshold, and comprehensively determine whether the terminal device needs to be handed over from the first uplink carrier to the second uplink carrier.

Optionally, in some embodiments, the network device may alternatively compare the first uplink measurement information with the second preset threshold, compare the second uplink measurement information with the third preset threshold, and comprehensively determine whether the terminal device needs to be handed over from the first uplink carrier to the second uplink carrier.

Optionally, in some embodiments, the network device may alternatively compare the downlink measurement information with the first preset threshold, compare the first uplink measurement information with the second preset threshold, compare the second uplink measurement information with the third preset threshold, and jointly determine whether the terminal device needs to be handed over from the first uplink carrier to the second uplink carrier.

Optionally, in some embodiments, the network device may alternatively compare the downlink measurement information with the first preset threshold, compare the first uplink measurement information with the second preset threshold, compare the second uplink measurement information with the third preset threshold, and jointly determine, with reference to load statuses of the first uplink carrier and the second uplink carrier, whether the terminal device needs to be handed over from the first uplink carrier to the second uplink carrier.

590. The network device sends handover instruction information to the terminal device when determining that the terminal device needs to perform the uplink carrier handover.

Optionally, in some embodiments, the handover instruction information is used to instruct the terminal device to be handed over from the first uplink carrier to the second uplink carrier.

Optionally, in some embodiments, the handover instruction information may be RRC signaling, a media access control control element (MAC CE), or downlink control information sent on a downlink physical control channel (PDCCH).

In this embodiment of this application, the network device determines, by using the target measurement information, whether the terminal device needs to perform the uplink carrier handover. Because this action is performed by the network device, an uplink carrier on which the terminal device needs to work can be determined more accurately and reliably, ensuring normal communication between the terminal device and the network device.

The foregoing describes in detail the method embodiments in the embodiments of this application with reference to FIG. 2 to FIG. 5. The following describes in detail embodiments of the network device and the terminal device in the embodiments of this application with reference to FIG. 6 and FIG. 7. It should be understood that the embodiments of the network device and the terminal device correspond to the method embodiments. For similar description, refer to the method embodiments.

Figure 6:
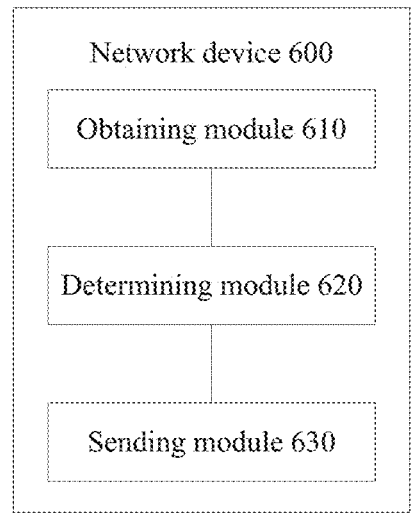
FIG. 6 is a schematic structural diagram of a network device according to an embodiment of this application.

FIG. 6 is a schematic block diagram of a network device 600 according to an embodiment of this application. As shown in FIG. 6, the network device 600 includes an obtaining module 610, a determining module 620, and a sending module 630.

The obtaining module 610 is configured to obtain target measurement information.

Optionally, in some embodiments, the network device 600 communicates with a terminal device in a current cell by using a first uplink carrier and a second uplink carrier.

Optionally, in some embodiments, the target measurement information includes at least one of the following measurement information: first uplink measurement information corresponding to the first uplink carrier, second uplink measurement information corresponding to the second uplink carrier, and downlink measurement information.

The determining module 620 is configured to determine, based on the target measurement information, whether the terminal device needs to be handed over from the first uplink carrier to the second uplink carrier.

The sending module 630 is configured to: when the terminal device needs to be handed over from the first uplink carrier to the second uplink carrier, send handover instruction information to the terminal device, where the handover instruction information is used to instruct the terminal device to be handed over from the first uplink carrier to the second uplink carrier.

In this embodiment of this application, the network device 600 obtains the target measurement information, and can determine, based on the target measurement information, whether the terminal device needs to be handed over from the first uplink carrier to the second uplink carrier. When determining that the terminal device needs to be handed over from the first uplink carrier to the second uplink carrier, the network device 600 may instruct, by using the handover instruction information, the terminal device to perform the uplink carrier handover. Because this action is performed by the network device 600, an uplink carrier on which the terminal device needs to work can be determined more accurately and reliably, thereby ensuring normal communication between the network device 600 and the terminal device.

Optionally, in some embodiments, the determining module 620 is specifically configured to:

compare the target measurement information with a preset threshold corresponding to the target measurement information; and determine, based on a comparison result of the comparison, whether the terminal device needs to be handed over from the first uplink carrier to the second uplink carrier.

Optionally, in some embodiments, the network device 600 may compare only the downlink measurement information with a preset threshold (a first preset threshold) corresponding to the downlink measurement information, and determine whether the terminal device needs to be handed over from the first uplink carrier to the second uplink carrier.

Optionally, in some embodiments, the network device 600 may alternatively compare only the first uplink measurement information with a preset threshold (a second preset threshold) corresponding to the first uplink measurement information, and determine whether the terminal device needs to be handed over from the first uplink carrier to the second uplink carrier.

Optionally, in some embodiments, the network device 600 may alternatively compare only the second uplink measurement information with a preset threshold (a third preset threshold) corresponding to the second uplink measurement information, and determine whether the terminal device needs to be handed over from the first uplink carrier to the second uplink carrier.

Optionally, in some embodiments, the network device 600 may alternatively compare the downlink measurement information with the first preset threshold, compare the first uplink measurement information with the second preset threshold, and comprehensively determine whether the terminal device needs to be handed over from the first uplink carrier to the second uplink carrier.

Optionally, in some embodiments, the network device 600 may alternatively compare the downlink measurement information with the first preset threshold, compare the second uplink measurement information with the third preset threshold, and comprehensively determine whether the terminal device needs to be handed over from the first uplink carrier to the second uplink carrier.

Optionally, in some embodiments, the network device 600 may alternatively compare the first uplink measurement information with the second preset threshold, compare the second uplink measurement information with the third preset threshold, and comprehensively determine whether the terminal device needs to be handed over from the first uplink carrier to the second uplink carrier.

Optionally, in some embodiments, the network device 600 may alternatively compare the downlink measurement information with the first preset threshold, compare the first uplink measurement information with the second preset threshold, compare the second uplink measurement information with the third preset threshold, and jointly determine whether the terminal device needs to be handed over from the first uplink carrier to the second uplink carrier.

Optionally, in some embodiments, the network device 600 may alternatively compare the downlink measurement information with the first preset threshold, compare the first uplink measurement information with the second preset threshold, compare the second uplink measurement information with the third preset threshold, and jointly determine, with reference to load statuses of the first uplink carrier and the second uplink carrier, whether the terminal device needs to be handed over from the first uplink carrier to the second uplink carrier.

Optionally, in some embodiments, the determining module 620 is further configured to determine, based on both the uplink measurement information and the respective load statuses of the first uplink carrier and the second uplink carrier, whether the terminal device needs to be handed over from the first uplink carrier to the second uplink carrier.

Optionally, in some embodiments, the obtaining module 610 is configured to receive a first uplink measurement signal sent by the terminal device on the first uplink carrier and a second uplink measurement signal sent on the second uplink carrier;

determine the first uplink measurement information based on the first uplink measurement signal; and determine the second uplink measurement information based on the second uplink measurement signal.

Optionally, in some embodiments, the sending module 630 is further configured to send first configuration information to the terminal device, where the first configuration information includes resource locations for sending the first uplink measurement signal and the second uplink measurement signal.

Optionally, in some embodiments, the first configuration information is a system message or dedicated radio resource control RRC signaling.

Optionally, in some embodiments, the sending module 630 is further configured to send second configuration information to the terminal device, where the second configuration information is used to configure a type of a downlink measurement event for the terminal device, and the downlink measurement event is used by the terminal device to measure a downlink measurement signal sent by the network device 600, so that the terminal device obtains the downlink measurement information.

Optionally, in some embodiments, the second configuration information may be further used to configure information for the terminal device, for example, measurement time of the downlink measurement event and a threshold for triggering the terminal device to report the downlink measurement information to the network device.

Optionally, in some embodiments, the second configuration information is a system message or dedicated radio resource control RRC signaling.

Optionally, in some embodiments, the terminal device may periodically send the downlink measurement information to the network device based on period duration configured by the network device, or may send the downlink measurement information to the terminal device based on an event triggering type configured by the network device after the event is triggered.

It should be understood that the first configuration information and the second configuration information may be same information or may be different information. This is not limited in this embodiment of this application.

Optionally, in some embodiments, the handover instruction information is at least one of RRC signaling, a media access control control element, and downlink control information carried on a physical downlink control channel.

In this embodiment of this application, the network device 600 determines, by using the target measurement information, whether the terminal device needs to perform the uplink carrier handover. Because this action is performed by the network device, an uplink carrier on which the terminal device needs to work can be determined more accurately and reliably, ensuring normal communication between the terminal device and the network device 600.

It should be understood that, the network device 600 according to this embodiment of this application may correspond to the network device in the embodiments of this application, and the foregoing and other operations and/or functions of the modules in the network device 600 are intended to implement corresponding procedures of the methods in FIG. 2 to FIG. 5. For brevity, details are not described herein again.

Figure 7:
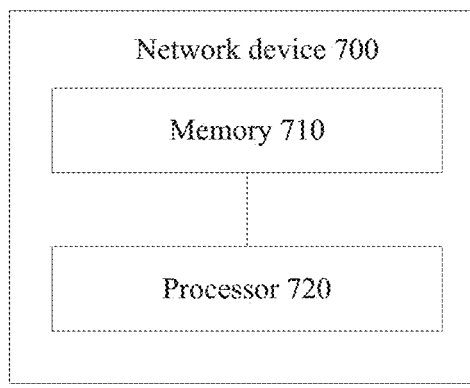
FIG. 7 is another schematic structural diagram of a network device according to an embodiment of this application.

FIG. 7 is a schematic structural diagram of a network device 700 according to an embodiment of this application. As shown in FIG. 7, the network device 700 includes a memory 710 and a processor 720, and the memory 710 and the processor 720 communicate with each other through an internal connection channel, to transfer a control and/or data signal.

The memory 710 is configured to store program code.

The processor 720 is configured to invoke the program code to implement the methods according to the embodiments of this application.

In this embodiment of this application, the processor 720 may be a central processing unit (CPU), a network processor (NP), or a combination of a CPU and an NP. The processor may further include a hardware chip. The hardware chip may be an application-specific integrated circuit (ASIC), a programmable logic device (PLD), or a combination thereof.

An embodiment of this application provides a computer readable medium, configured to store computer program code, and the computer program includes instructions for performing the uplink carrier handover methods in the foregoing embodiments of this application in FIG. 2 to FIG. 5. The readable medium may be a read-only memory (ROM) or a random access memory (RAM). This is not limited in this embodiment of this application.

Figure 8:
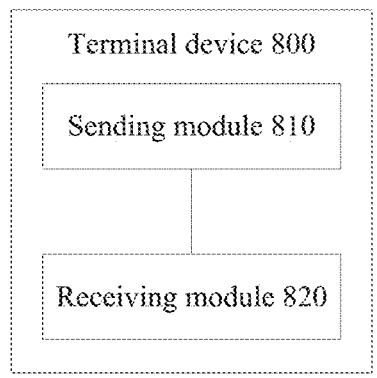
FIG. 8 is a schematic structural diagram of a terminal device according to an embodiment of this application.

FIG. 8 is a schematic structural diagram of a terminal device 800 according to an embodiment of this application. As shown in FIG. 8, the terminal device 800 includes a sending module 810 and a receiving module 820.

The sending module 810 is configured to send at least one of downlink measurement information, a first uplink measurement signal, and a second uplink measurement signal to a network device.

Optionally, in some embodiments, at least one of the downlink measurement information, the first uplink measurement signal, and the second uplink measurement signal is used by the network device to determine target measurement information.

Optionally, in some embodiments, the target measurement information includes at least one of the following measurement information: first uplink measurement information corresponding to a first uplink carrier, second uplink measurement information corresponding to a second uplink carrier, and the downlink measurement information.

Optionally, in some embodiments, the target measurement information is used by the network device to determine whether the terminal device 800 needs to be handed over from the first uplink carrier to the second uplink carrier.

Optionally, in some embodiments, the network device communicates with the terminal device 800 in a current cell by using the first uplink carrier and the second uplink carrier.

The receiving module 820 is configured to: when the network device determines that the terminal device 800 needs to be handed over from the first uplink carrier to the second uplink carrier, receive handover instruction information sent by the network device.

Optionally, in some embodiments, the handover instruction information is used to instruct the terminal device 800 to be handed over from the first uplink carrier to the second uplink carrier.

Optionally, in some embodiments, the receiving module 820 is specifically configured to:

receive first configuration information sent by the network device and/or receive second configuration information sent by the network device.

Optionally, in some embodiments, the first configuration information includes resource locations for sending the first uplink measurement signal and the second uplink measurement signal.

Optionally, in some embodiments, the first configuration information is a system message or dedicated radio resource control RRC signaling.

Optionally, in some embodiments, the second configuration information is used by the network device to configure a type of a downlink measurement event for the terminal device 800.

Optionally, in some embodiments, the downlink measurement event is used by the terminal device 800 to measure a downlink measurement signal sent by the network device, so that the terminal device obtains the downlink measurement information.

Optionally, in some embodiments, the second configuration information is a system message or dedicated radio resource control RRC signaling.

It should be understood that the first configuration information and the second configuration information may be same information or may be different information. This is not limited in this embodiment of this application.

Optionally, in some embodiments, the handover instruction information is at least one of RRC signaling, a media access control control element, and downlink control information carried on a physical downlink control channel.

It should be understood that, the terminal device 800 according to this embodiment of this application may correspond to the terminal device in the embodiments of this application, and the foregoing and other operations and/or functions of the modules in the terminal device 800 are intended to implement corresponding procedures of the methods in FIG. 2 to FIG. 5. For brevity, details are not described herein again.

Figure 9:
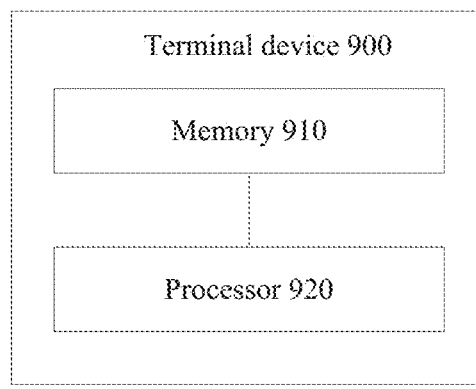
FIG. 9 is another schematic structural diagram of a terminal device according to an embodiment of this application.

FIG. 9 is a schematic structural diagram of a terminal device 900 according to an embodiment of this application. As shown in FIG. 9, the terminal device 900 includes a memory 910 and a processor 920. The memory 910 and the processor 920 communicate with each other through an internal connection channel, to transfer a control and/or data signal.

The memory 910 is configured to store program code.

The processor 920 is configured to invoke the program code to implement the methods according to the embodiments of this application.

In this embodiment of this application, the processor 920 may be a central processing unit (CPU), a network processor (NP), or a combination of a CPU and an NP. The processor may further include a hardware chip. The hardware chip may be an application-specific integrated circuit (ASIC), a programmable logic device (PLD), or a combination thereof.

An embodiment of this application provides a computer readable medium, configured to store computer program code, and the computer program includes instructions for performing the uplink carrier handover methods in the foregoing embodiments of this application in FIG. 2 to FIG. 5. The readable medium may be a read-only memory (ROM) or a random access memory (RAM). This is not limited in this embodiment of this application.

It should be understood that, the terminal device 900 according to this embodiment of this application may correspond to the terminal device in the embodiments of this application, and the foregoing and other operations and/or functions of the modules in the terminal device 900 are intended to implement corresponding procedures of the methods in FIG. 2 and FIG. 5. For brevity, details are not described herein again.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, however, it should not be considered that the implementation goes beyond the scope of this application.

It may be clearly understood by a person skilled in the art that, for the purpose of convenient and brief description, for a detailed working process of the foregoing system, apparatus, and unit, refer to the corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The computer software product is stored in a storage medium, and includes several instructions for instructing a computer device (which may be a personal computer, a server, or a network device) to perform all or some of the steps of the methods described in the embodiments of this application. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementations of this application, however are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. An uplink carrier handover method, wherein the method is applied to a terminal device, and the method comprises:
   sending of a first uplink measurement signal and a second uplink measurement signal to a network device, wherein:
   the first uplink measurement signal comprises a first uplink reference signal sent on a first uplink carrier, wherein the second uplink measurement signal comprises a second uplink reference signal sent on a second uplink carrier;
   the first uplink measurement signal and the second uplink measurement signal are used by the network device to determine target measurement information;
   the target measurement information comprises first uplink measurement information corresponding to the first uplink carrier and second uplink measurement information corresponding to the second uplink carrier;

the target measurement information is used by the network device to determine whether the terminal device needs to be handed over from the first uplink carrier to the second uplink carrier;

the network device communicates with the terminal device in a current cell by using the first uplink carrier and the second uplink carrier; and the first uplink measurement information is compared with a first preset threshold to determine a first comparison result, the second uplink measurement information is compared with a second preset threshold to determine a second comparison result, and the first comparison result and the second comparison result are used to determine whether the terminal device needs to be handed over from the first uplink carrier to the second uplink carrier; and when the network device determines that the terminal device needs to be handed over from the first uplink carrier to the second uplink carrier, receiving handover instruction information from the network device, wherein the handover instruction information is used to instruct the terminal device to be handed over from the first uplink carrier to the second uplink carrier.

2. The method according to claim 1, wherein before the sending a first uplink measurement signal and a second uplink measurement signal to a network device, the method further comprises at least one of:

receiving first configuration information from the network device, wherein the first configuration information comprises resource locations for sending the first uplink measurement signal and the second uplink measurement signal; or receiving second configuration information from the network device, wherein the second configuration information is used by the network device to configure a type of a downlink measurement event for the terminal device, and wherein the downlink measurement event is used by the terminal device to obtain downlink measurement information by measuring a downlink measurement signal from the network device.

3. The method according to claim 2, wherein each of the first configuration information and the second configuration information is a system message or dedicated radio resource control (RRC) signaling.

4. The method according to claim 1, wherein the handover instruction information is at least one of RRC signaling, a media access control control element, or downlink control information carried on a physical downlink control channel.

5. A network device, wherein the network device comprises:

a storage medium including executable instructions; and
at least one processor;
wherein the executable instructions, when executed by the at least one processor, cause the network device to:
receive a first uplink measurement signal and a second uplink measurement signal from a terminal device, wherein the first uplink measurement signal comprises a first uplink reference signal sent on a first uplink carrier, and wherein the second uplink measurement signal comprises a second uplink reference signal sent on a second uplink carrier;
obtain target measurement information, wherein the network device communicates with the terminal device in a current cell by using the first uplink carrier and the second uplink carrier, and wherein the target measurement information comprises first uplink measurement information corresponding to the first uplink carrier and second uplink measurement information corresponding to the second uplink carrier;
determine, based on the target measurement information, whether the terminal device needs to be handed over from the first uplink carrier to the second uplink carrier, wherein the determining comprises:
comparing the first uplink measurement information with a first preset threshold to determine a first comparison result;
comparing the second uplink measurement information with a second preset threshold to determine a second comparison result; and
determining, using the first comparison result and the second comparison result, whether the terminal device needs to be handed over from the first uplink carrier to the second uplink carrier; and
in response to determining that the terminal device needs to be handed over from the first uplink carrier to the second uplink carrier, send handover instruction information to the terminal device, wherein the handover instruction information is used to instruct the terminal device to be handed over from the first uplink carrier to the second uplink carrier.

6. The network device according to claim 5, wherein the executable instructions, when executed by the at least one processor, further cause the network device to:
determine, based on respective load statuses of the first uplink carrier and the second uplink carrier, whether the terminal device needs to be handed over from the first uplink carrier to the second uplink carrier.

7. The network device according to claim 5, wherein the executable instructions, when executed by the at least one processor, further cause the network device to:
determine the first uplink measurement information based on the first uplink measurement signal; and
determine the second uplink measurement information based on the second uplink measurement signal.

8. The network device according to claim 7, wherein the executable instructions, when executed by the at least one processor, further cause the network device to:
send first configuration information to the terminal device, wherein the first configuration information comprises resource locations for sending the first uplink measurement signal and the second uplink measurement signal.

9. The network device according to claim 5, wherein the executable instructions, when executed by the at least one processor, further cause the network device to:
receive downlink measurement information from the terminal device.

10. The network device according to claim 9, wherein the executable instructions, when executed by the at least one processor, further cause the network device to:
send second configuration information to the terminal device, wherein the second configuration information is used to configure a type of a downlink measurement event for the terminal device, and wherein the downlink measurement event is used by the terminal device to obtain the downlink measurement information by measuring a downlink measurement signal from the network device.

11. The network device according to claim 8, wherein the first configuration information and second configuration information are a system message or dedicated radio resource control (RRC) signaling.

12. The network device according to claim 5, wherein the handover instruction information is at least one of RRC signaling, a media access control control element, or downlink control information carried on a physical downlink control channel.

13. A terminal device, wherein the terminal device comprises:
a storage medium including executable instructions; and
at least one processor;
wherein the executable instructions, when executed by the at least one processor, cause the terminal device to:
send a first uplink measurement signal and a second uplink measurement signal to a network device, wherein:
the first uplink measurement signal comprises a first uplink reference signal sent on a first uplink carrier, wherein the second uplink measurement signal comprises a second uplink reference signal sent on a second uplink carrier;
the first uplink measurement signal and the second uplink measurement signal are used by the network device to determine target measurement information;
the target measurement information comprises first uplink measurement information corresponding to the first uplink carrier and second uplink measurement information corresponding to the second uplink carrier;
the target measurement information is used by the network device to determine whether the terminal device needs to be handed over from the first uplink carrier to the second uplink carrier;
the network device communicates with the terminal device in a current cell by using the first uplink carrier and the second uplink carrier; and
the first uplink measurement information is compared with a first preset threshold to determine a first comparison result, the second uplink measurement information is compared with a second preset threshold to determine a second comparison result, and the first comparison result and the second comparison result are used to determine whether the terminal device needs to be handed over from the first uplink carrier to the second uplink carrier; and
when the network device determines that the terminal device needs to be handed over from the first uplink carrier to the second uplink carrier, receive handover instruction information from the network device, wherein the handover instruction information is used to instruct the terminal device to be handed over from the first uplink carrier to the second uplink carrier.

14. The terminal device according to claim 13, wherein the executable instructions, when executed by the at least one processor, further cause the terminal device to:
receive first configuration information from the network device, wherein the first configuration information comprises a resource location for sending the first uplink measurement signal and the second uplink measurement signal; or
receive second configuration information from the network device, wherein the second configuration information is used by the network device to configure a type of a downlink measurement event for the terminal device, and wherein the downlink measurement event is used by the terminal device to obtain downlink measurement information by measuring a downlink measurement signal from the network device.

15. The terminal device according to claim 14, wherein each of the first configuration information and the second configuration information is a system message or dedicated radio resource control (RRC) signaling.

16. The terminal device according to claim 13, wherein the handover instruction information is at least one of RRC signaling, a media access control control element, or downlink control information carried on a physical downlink control channel.

* * * * *